(12) United States Patent
Madlener et al.

(10) Patent No.: US 6,370,789 B1
(45) Date of Patent: Apr. 16, 2002

(54) PROBE FOR MACHINE TOOLS WITH A TOOL SPINDLE

(76) Inventors: Wolfgang Madlener, Am Reutehof 42, 88213 Ravensburg; Wilfried Veil, Am Langholz 11, 88289 Waldburg, both of (DE)

( * ) Notice: Subject to any disclaimer, the term of this patent is extended or adjusted under 35 U.S.C. 154(b) by 0 days.

(21) Appl. No.: 09/534,035

(22) Filed: Mar. 24, 2000

(30) Foreign Application Priority Data

Mar. 24, 1999 (DE) .......................................... 199 13 580
Mar. 8, 2000 (DE) .......................................... 200 03 960

(51) Int. Cl.$^7$ ................................................ G01B 7/28
(52) U.S. Cl. ....................... 33/561; 33/366.15; 340/689
(58) Field of Search ........................ 33/366.15, 366.21, 33/559, 560, 561, 645; 340/686.1, 686.2, 689, 679

(56) References Cited

U.S. PATENT DOCUMENTS

| | | | |
|---|---|---|---|
| 3,710,371 A | * | 1/1973 | Whalen et al. ............. 340/689 |
| 3,786,472 A | * | 1/1974 | Scopacasa ................. 340/689 |
| 5,001,464 A | * | 3/1991 | Tanaka ........................ 33/561 |
| 5,005,308 A | * | 4/1991 | Parks ...................... 33/366.21 |
| 5,150,529 A | * | 9/1992 | Collingwood ................ 33/558 |
| 5,731,761 A | * | 3/1998 | Sychra ........................ 340/689 |
| RE37,030 E | * | 1/2001 | Lloyd et al. .................. 33/559 |

FOREIGN PATENT DOCUMENTS

| | | |
|---|---|---|
| DE | 34 22 181 | 12/1984 |
| DE | 42 14 697 | 11/1993 |
| DE | 44 44 674 | 6/1996 |
| EP | 0 108 521 | 5/1984 |
| EP | 0 872 787 | 10/1998 |

* cited by examiner

*Primary Examiner*—G. Bradley Bennett
(74) *Attorney, Agent, or Firm*—Venable; Robert Kinberg

(57) ABSTRACT

Probe for attaching at certain times to the tool spindle of a machine tool, which probe emits by means of a stylus (5) a measuring signal which is transmitted via a transmission channel (8) to a receiving and evaluating device (9) of the machine tool. For power-saving purposes, the transmission channel (8) is kept in the functioning state, by means of an activation system contained in the probe, only during the actual measuring operation. The activation system comprises a switching device (15) and an electronic assembly (13), which is characterized in that, from when it reaches its switching position, a control check is carried out with respect to continuance of the switching position and the activation or deactivation of the transmission channel (8) is only triggered when the switching position continues uninterruptedly for the duration of a certain interrogation time.

8 Claims, 3 Drawing Sheets

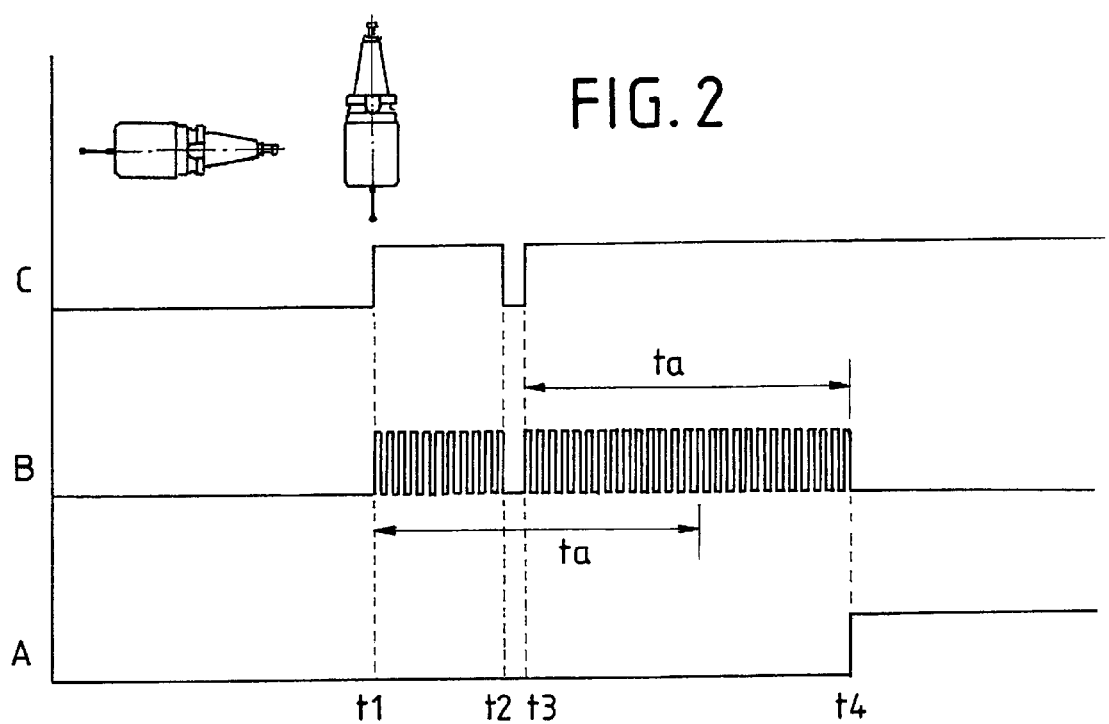

PROBE FOR MACHINE TOOLS WITH A TOOL SPINDLE

BACKGROUND OF THE INVENTION

The invention concerns a probe for attaching at certain times to the tool spindle of a machine tool.

Probes of this kind are known for example from European Patent Specification 0 108 521. They have a stylus which is attached in a resiliently deflectable manner and activates a measuring contact device when it touches a workpiece and is therefore deflected out of its position of rest. In the course of a machining operation, various tools are attached one after the other to the spindle. The latter "grabs" these automatically from a tool magazine. At the end of the machining operation, or after certain machining phases, a control measurement of the workpiece is carried out automatically with the probe. For this purpose, the probe, which likewise assumes a place in the tool magazine, is fitted onto the spindle instead of a tool. The electrical measuring signal produced by deflection of the stylus when it touches the workpiece is transmitted by means of a transmission channel from the housing of the probe to a receiving and evaluating device fastened on the machine framework. The transmission channel may be an infrared light link, a radio link, an inductive transmission device or the like.

The probe is generally supplied with energy via a battery, which is accommodated in the probe housing.

Maintaining the operating state of the transmission channel requires constant energy consumption, which in view of the restricted space and weight conditions in the probe housing should be kept as low as possible. For this purpose, it is known per se to keep the transmission channel in an inoperative, switched-off state or power-saving sleeping state during machining operation and to activate it only for the limited measuring time. The latter is achieved by acting on the probe from outside, for example by means of a further infrared link or by means of a switching device which is activated when the probe is placed against the tool spindle or thereafter via the tool spindle.

The invention, on the other hand, is concerned with an autonomous device for activating the transmission channel which is accommodated in the probe housing and is not externally controlled. It is known from the cited European patent to use a centrifugal switch or rotary acceleration sensor which responds to the rotational movement of the spindle when the probe is attached to the spindle, its housing axis being aligned with the spindle axis.

It is disadvantageous in this case that the switches or sensors of this activation device can in principle respond not only when there are pure rotational movements about the center axis of the housing but also when there are other intermittent movements, which occur when the probe is being transported between the magazine and the measuring location. It is therefore necessary to make the restoring resilient forces of the inert mass of this switch relatively great, so that the switch responds only when the spindle reaches high rotational speeds or is strongly accelerated or decelerated. This precondition for satisfactory functioning of the known activation device on the one hand prolongs the operating time of the transmission channel, and acts counter to the power-saving effect, and on the other hand prolongs the measuring cycle to the detriment of the overall piece time for machining the workpiece.

BRIEF SUMMARY OF THE INVENTION

The invention is based on the object of specifying measures by which the operating time of the transmission channel can be shortened and can be better adapted to the time period required for carrying out the measuring operation.

The invention is based on a probe for attaching at certain times to the tool spindle of a machine tool, which probe comprises a housing, a stylus which is mounted on the housing, an electronic assembly which is arranged in the housing, is supplied from a power source and generates a measuring signal when the stylus is deflected out of the position of rest and also a switching device which switches, for example, in dependence on a movement and/or position of the probe and by which it is possible in interaction with the electronic assembly to activate or deactivate a transmission channel via which the measuring signal can be transmitted to a receiving and evaluating device of the machine tool. The essential idea of the invention is consequently that the electronic assembly is designed for keeping a control check on the switching device from when it reaches its switching position with respect to continuance of the switching position and for triggering the activation or deactivation of the transmission channel if the switching position continues uninterruptedly for the duration of a predetermined interrogation time. The electronic assembly proposed and described by its functional features has the consequence that a more sensitive switching device can be used and nevertheless erroneous signals as a consequence of intermittent transporting movements of the probe are avoided. The interrogation time may be, for example, one or two seconds. On account of the higher sensitivity of the switching device, it is possible for example for the spindle speed or the spindle acceleration for triggering the activation signal to be lower than previously. Depending on which position the switching device is in -to reach the switching position, i.e. in the active measuring position or in the inactive parking position, the continuance of the switching position is either a trigger for the activation or deactivation of the transmission channel. What is decisive, however, for both possibilities is the "verifying time period", in which the switching device must assume the switching position without interruption.

In a development of the invention it is advantageous to use as the switching device an inclination switch, which assumes its switching position within a specific range of inclination positions of the probe with respect to a transverse axis. Consequently, the event which triggers the activation or deactivation signal is in this case not a movement but an assumption by the probe of a position inclined in a defined state with respect to a transverse axis of the probe housing. The, for example, brief pausing in an activation position during the transporting movement from the tool magazine to the measuring location requires a significantly smaller amount of time to be expended than the acceleration up to a specific rotational speed and subsequent braking, as is the case for example when the probe is activated by a centrifugal switch. Inclination switches are advantageous in particular whenever the probe and the machine tools are kept in a magazine which is rotationally mounted (turret magazine). The decisive range of inclination positions for activating the transmission channel may comprise, for example in the case of a vertical tool spindle, the vertical position of the probe with downwardly pointing stylus and the positions deviating from this by a few angular degrees.

Preferably suitable as an inclination switch is a liquid switch, in particular a mercury switch. The switch vessel receiving the liquid may consist of a conductive or nonconductive material and have electrodes designed according to requirements.

In a further particularly advantageous embodiment of the invention, the stylus with a measuring contact device for sensing a stylus deflection forms the switching device, the electronic assembly being designed for deactivating the transmission channel when the measuring contact device senses a deflection of the stylus which continues uninterruptedly for longer than a predetermined period of time.

This accordingly dispenses with a separate switching device for the deactivation of the transmission channel. Rather, the already existing stylus with a measuring contact device assumes this function. This must be imagined by envisaging that the stylus of the probe is accommodated at its storage location for example in such a way that the stylus is constantly deflected. That is to say, as soon as the probe reaches the storage location, the stylus of the probe is deflected by suitable means, whereby the transmission channel switches off after a predetermined interrogation time.

The electronic assembly is preferably designed for activating the transmission channel as soon as the measuring contact switch detects no deflection of the stylus. That is to say the transmission channel switches on at the moment at which the probe is removed from its storage place.

BRIEF DESCRIPTION OF THE DRAWINGS

Two exemplary embodiments of the invention are explained below with reference to the drawing, in which specifically:

FIG. 2 shows a functional diagram concerning the activation of a transmission channel and FIG. 3 shows a schematic representation of a mercury switch in three different positions.

DETAILED DESCRIPTION OF THE INVENTION

Figure 1:
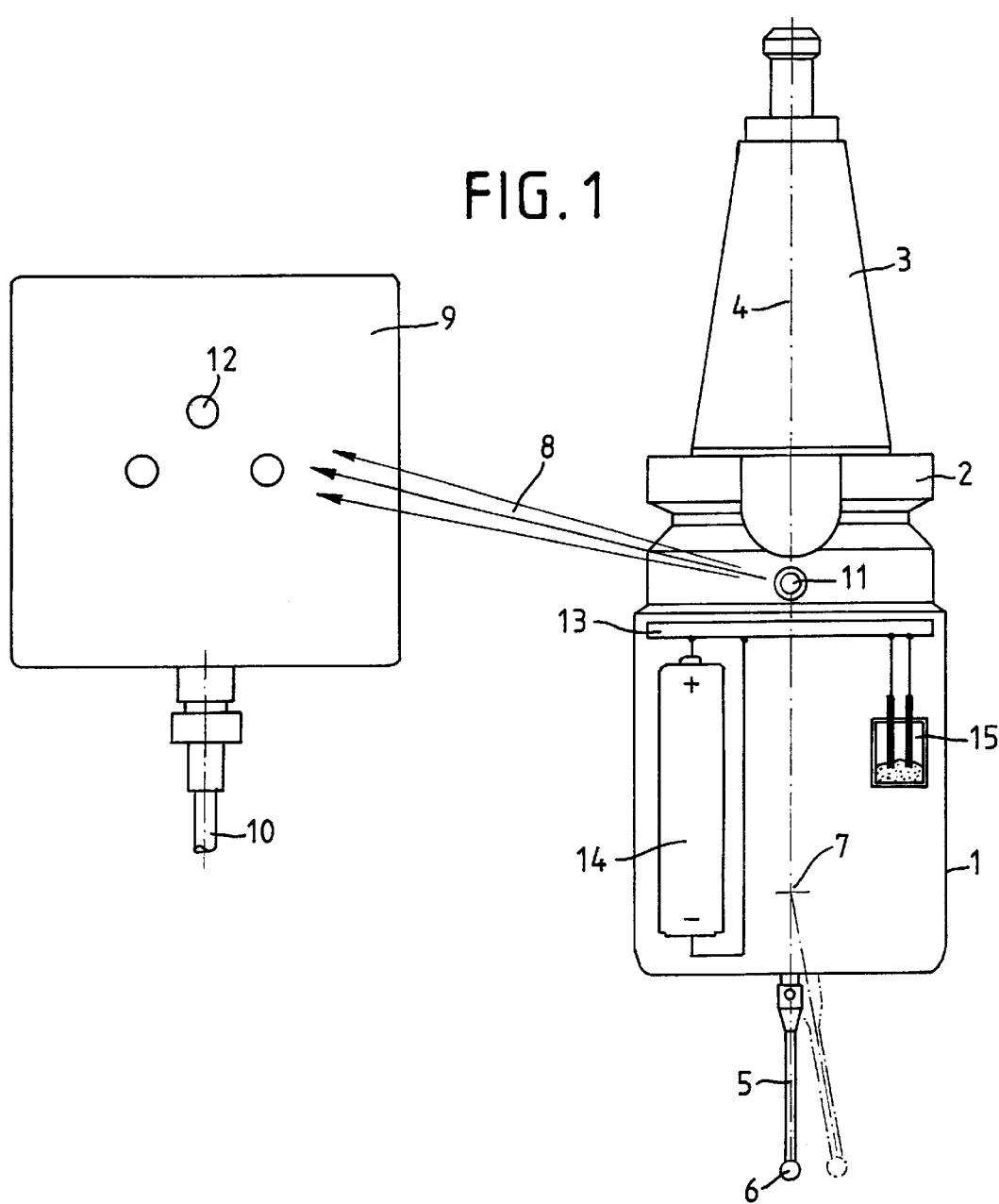
FIG. 1 shows a schematic representation of a first probe with regard to its housing content.

The probe represented in FIG. 1 has a cylindrical housing 1, a central part 2 and a tapered accepting shank 3. The outer form of the probe is designed overall to be rotationally symmetrical with respect to a center axis 4. By insertion in a corresponding tapered hole on the tool spindle of a machine tool, such as milling cutters, drills or other machine tools, the tapered accepting shank 3 can be connected to the said spindle. Protruding downward out of the housing 1 is a stylus 5, which is provided at the end with a sapphire ball 6. The stylus is mounted in such a way that it is able to tumble with respect to a swivel point 7 and normally assumes a position of rest in which it is in line with the center axis 4. If the stylus ball is brought up to the side of a workpiece, the stylus 5 is deflected counter to a restoring spring force. A deflected position is indicated by dash-dotted lines.

As known, the stylus 5 is in connection with an electrical measuring contact device (not represented). Even when there is the slightest deflection of the stylus, said device switches to the generation of a measuring signal, which is transmitted via an infrared link 8 to a receiving and evaluating device 9. The latter is fixedly attached to the machine tool and connected via a cable 10 to the machine controller. On the central part 2, four infrared transmitters 11 are distributed over the circumference, in order in any desired swivel-angle position of the probe to reach the infrared receiver 12, of which in the example three are attached to the receiving and evaluating device 9.

The electronic components of the infrared transmitter are located on a circuit board 13, which is accommodated in the housing 1 of the probe. Also connected to this board 13 is the measuring contact device (not represented). Furthermore, power sources 14, which supply the board, are accommodated in the housing 1.

In the case of the electronic assembly, which is realized in the circuit board 13, a distinction must be drawn between two operating states, namely a sleeping state with switched-off infrared transmitters and very low power consumption on the one hand and a functional state with activated infrared link 8 on the other hand. Only in the functional state can the measuring signal, and if appropriate a warning signal for shutting down the machine tool, be transmitted.

To switch over from the sleeping state into the functional state, an inclination switch 15 is accommodated in the housing 1. This switch is likewise connected to the circuit board 13 and in FIG. 1 is represented only highly schematically. It allows a primary activation signal, which does not as yet bring about the functional state of the transmission channel, to be produced when the probe reaches for instance a vertical position in which the stylus is pointing downward. This presupposes that, when stored in the tool magazine, the probe assumes an inclined position with respect to its measuring position.

A special feature of the electronic assembly allows a reliable and unambiguous secondary activation signal to be successfully obtained in spite of any vibrations possibly to be expected.

The operating mode of the electronic assembly is described with reference to FIG. 2. In the latter, three significant switching states or signals are plotted over time. The lowermost line A shows the status of the transmission channel, i.e. of the infrared link 8. Represented in the second line B is the interrogation signal of a microprocessor, which is for example part of the electronic assembly, and in the third line C is the switching position of the inclination switch 15 built into the probe. The microprocessor comprises a counter, which begins counting when the inclination switch 15 is switched on and emits the secondary activation signal for the infrared link 8 after a certain interrogation time ta of, for example, 2 seconds. If, however, the switching position of the inclination switch 15 is not maintained continuously during this time, the counter is reset and begins counting afresh. This is intended to achieve the effect that not every brief response of the inclination switch 15, perhaps happening by chance, leads to activation of the infrared link 8. Rather, this is only to take place when the signal of this switch remains uninterrupted over the interrogation time ta, which ensures that the probe has come to rest in its vertical position and is ready for measuring.

At the beginning of the time sequence considered, the probe is in a horizontal storage position, which is symbolically indicated. At the point in time t1, the inclination switch 15 switches on (primary signal). The system interprets this as the vertical probe position and the microprocessor begins counting. Before the full interrogation time ta has elapsed, however, the signal of the inclination switch 15 experiences an interruption. It opens at t2 and immediately closes again at t3. Accordingly, the microprocessor begins counting afresh. This time, the end of the interrogation time ta is reached at t4 and in this case a secondary activation signal is emitted by the microprocessor, which signal is represented in the line A and actually activates the infrared link 8.

In the same way, the system is able also to detect a plurality of interruptions or successive brief primary switch-on pulses of the inclination switch 15 and prevent erroneous activation of the infrared link.

Figure 3:
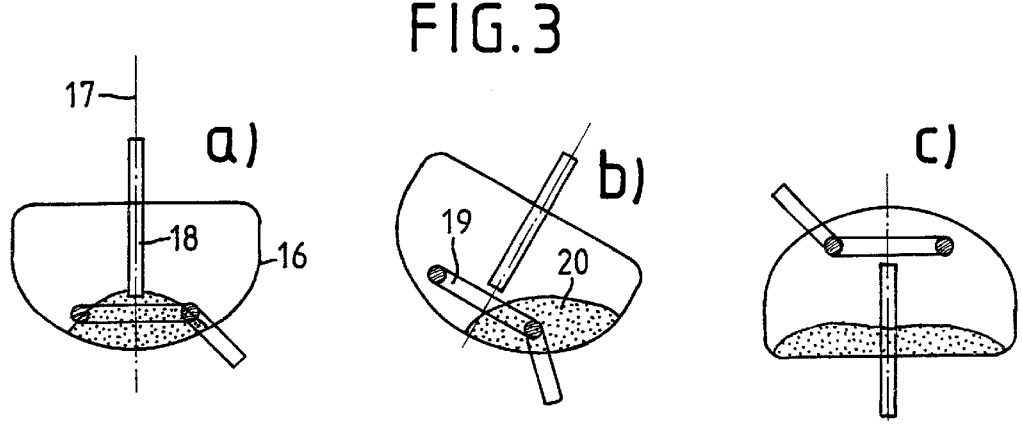

By contrast with the inclination switch 15 according to FIG. 1, which is designed as a liquid switch with two parallel electrode pins, FIG. 3 is intended to illustrate how another design of the electrodes in the case of a mercury switch allows the effect to be achieved that the switching angle when inclining about a transverse axis is always the same, irrespective of the angular position with respect to the center axis, and that, at an inclination through 180°, the switch does not likewise close.

The mercury switch represented has a rotationally symmetrical glass vessel 16 with a center axis 17. Protruding into the glass vessel is a coaxial electrode pin 18. On the other hand, the glass vessel contains, via a lateral lead, an annular electrode 19. FIG. 3*a* shows the position in which a drop of mercury 20 connects the two electrodes to each other. In FIG. 3*b*, on the other hand, the glass vessel 16 is inclined and the drop of mercury has released the electrode pin 18. The switching angle is the same for every angular position with respect to the center axis 17. FIG. 3*c* finally shows the glass vessel 16 inverted. The drop of mercury 20 surrounds the electrode pin 18 and allows no contact to be produced with respect to the annular electrode 19.

Figure 4A:
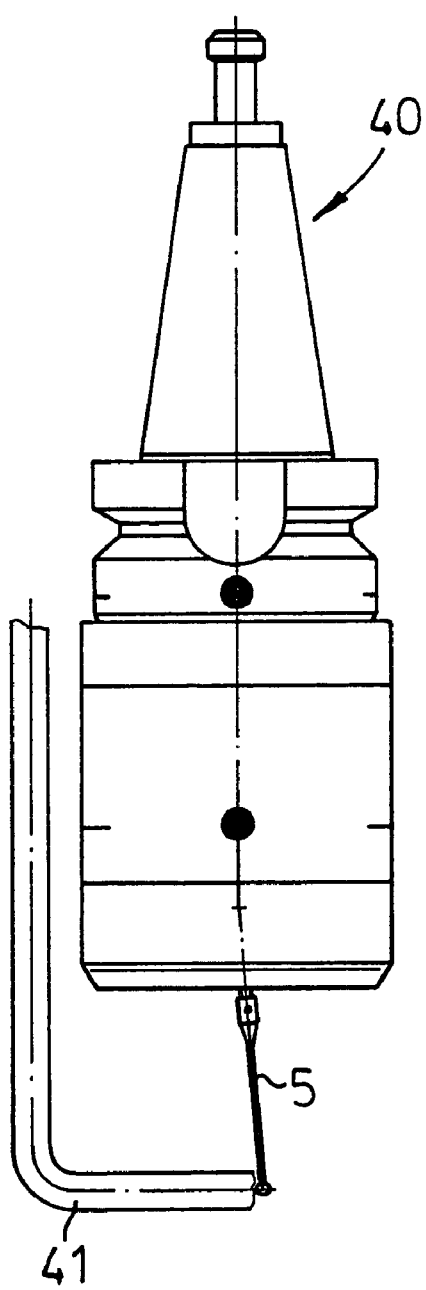
FIGS. 4a and 4b show a schematically represented second probe in a tool magazine position and a spindle position.
Figure 4B:
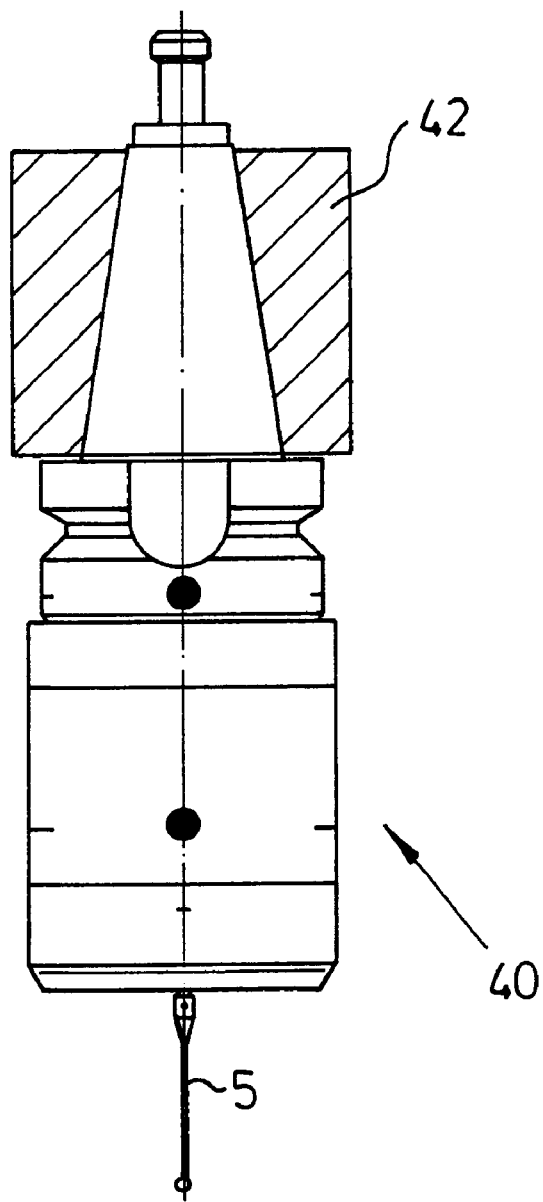

The probe 40 represented in FIGS. 4*a* and 4*b* is identical with respect to the outer form to the probe according to FIG. 1. By contrast with this probe, the probe 40 does not, however, have a separate inclination switch 15. Rather, the stylus 5 is used with a downstream measuring contact device (not represented) also for the deactivation or activation of the transmission channel 8.

In this case, the electronic assembly is designed in such a way as to transfer the probe into a "sleeping position" when the stylus 5 has been deflected uninterruptedly for a certain period of time, for example 30 seconds. For this purpose, a corresponding bearing bar 41, by means of which the stylus 5 is always deflected in the position of rest of the probe 40, may be provided at a storing location in the tool magazine.

In FIG. 4*b*, the probe 40 has been inserted into a spindle accepting means 42. The stylus has not been deflected, but is in the position of rest.

The electronic assembly is preferably designed in such a way that the probe, and consequently the transmission channel, is activated at the moment when the stylus 5 returns to the position of rest according to FIG. 4*b* from a deflected position in which it has remained for longer than the predetermined period of time, for example 30 seconds.

List of Designations:
1 housing
2 central part
3 tapered accepting shank
4 center axis
5 stylus
6 sapphire ball
7 swivel point
8 infrared link
9 receiving and evaluating device
10 cable
11 infrared transmitter
12 infrared receiver
13 circuit board
14 power source
15 inclination switch
16 glass vessel
17 center axis
18 electrode pin
19 annular electrode
20 drop of mercury
40 probe
41 bearing bar
42 spindle accepting means
A–C lines
t1–t4 points in time
ta interrogation time

What is claimed is:

1. A probe for attachment to a tool spindle of a machine tool, comprising:

a housing;

a stylus mounted on the housing;

an electronic assembly arranged in the housing for generating a measuring signal when the stylus is deflected out of a rest position; and a switching device for indicating at least one actuating switching position, wherein the electronic assembly activates or deactivates a transmission channel for transmitting the measurement signal to a receiving and evaluating device of the machine tool if the actuating switching position indication continues uninterruptedly for a predetermined interrogation time.

2. The probe of claim 1, further comprising a power source arranged in the housing for supplying power to the electronic assembly.

3. The probe according to claim 1, wherein the switching device includes an inclination switch that assumes the actuating switching position within a range of inclination positions of the probe with respect to the traverse axis.

4. The probe according to claim 1, wherein the switching device includes a liquid switch.

5. The probe according to claim 4, wherein the switching device includes a mercury switch.

6. A probe for attachment to the tool spindle of a machine tool, comprising:

a housing;

a stylus mounted on the housing and having a measuring contact device to determine and to indicate an actuating switching position based on a deflection of the stylus;

an electronic assembly arranged in the housing for generating a measuring signal when stylus is deflected out of a rest position and for deactivating a transmission channel for transmitting the measurement signal to a receiving and evaluating device of the machine tool if the actuating switching position indication continues uninterruptedly for a predetermined interrogation time.

7. The probe of claim 6, further comprising a power source arranged in the housing for supplying power to the electronic assembly.

8. The probe according to claim 6, wherein the electronic assembly is designed for activating the transmission channel if the measuring contact detects no deflection of the stylus.

* * * * *